US011693578B2

(12) United States Patent
Shapiro et al.

(10) Patent No.: US 11,693,578 B2
(45) Date of Patent: Jul. 4, 2023

(54) METHOD AND SYSTEM FOR HANDOFF WITH PORTABLE STORAGE DEVICES

(71) Applicant: iodyne, LLC, Mill Valley, CA (US)

(72) Inventors: Michael W. Shapiro, Mill Valley, CA (US); Jeffrey Paul Ferreira, San Mateo, CA (US)

(73) Assignee: iodyne, LLC, Mill Valley, CA (US)

( * ) Notice: Subject to any disclaimer, the term of this patent is extended or adjusted under 35 U.S.C. 154(b) by 0 days.

(21) Appl. No.: 17/669,650

(22) Filed: Feb. 11, 2022

(65) Prior Publication Data

US 2022/0261169 A1  Aug. 18, 2022

Related U.S. Application Data

(60) Provisional application No. 63/149,775, filed on Feb. 16, 2021.

(51) Int. Cl.
*G06F 3/06* (2006.01)

(52) U.S. Cl.
CPC .......... *G06F 3/0647* (2013.01); *G06F 3/0604* (2013.01); *G06F 3/067* (2013.01); *G06F 3/0631* (2013.01); *G06F 3/0664* (2013.01)

(58) Field of Classification Search
CPC .... G06F 3/0647; G06F 3/0604; G06F 3/0631; G06F 3/0664; G06F 3/067
See application file for complete search history.

(56) References Cited

U.S. PATENT DOCUMENTS

| | | | |
|---|---|---|---|
| 7,584,340 B1* | 9/2009 | Colgrove | H04L 67/1097 713/153 |
| 2009/0292834 A1* | 11/2009 | Neemidge | G06F 3/0635 710/19 |
| 2015/0293708 A1* | 10/2015 | Lang | G06F 3/0613 711/114 |
| 2016/0328007 A1* | 11/2016 | Aranjani | G06F 3/0634 |
| 2016/0378353 A1* | 12/2016 | Schmisseur | G06F 3/0604 711/114 |
| 2019/0332410 A1* | 10/2019 | Chopra | G06F 11/1464 |

* cited by examiner

*Primary Examiner* — Ryan Bertram
(74) *Attorney, Agent, or Firm* — Chamberlain, Hrdlicka, White, Williams & Aughtry

(57) ABSTRACT

A storage device for providing data storage services to a source host and a destination host includes persistent storage and a controller. The controller obtains a handoff initiation request for a handoff of storage resources of the persistent storage allocated to the source host, the handoff initiation request specifies that the storage resource is to be handed off to the destination host; in response to obtaining the handoff initiation request: quiesces the storage resource; terminates use of the storage resource by the source host after quiescing the storage resource; after terminating the use of the storage resource by the source host, connects the destination host to the storage resource; and after connecting the destination host to the storage resource, enables use of the storage resource by the destination host.

20 Claims, 5 Drawing Sheets

METHOD AND SYSTEM FOR HANDOFF WITH PORTABLE STORAGE DEVICES

CROSS-REFERENCE TO RELATED APPLICATIONS

This application claims benefit of U.S. Provisional Patent Application No. 63/149,775 and entitled: "METHOD AND SYSTEM FOR HANDOFF WITH PORTABLE STORAGE DEVICES." under 35 U.S.C. § 120. U.S. Provisional Patent Application No. 63/149,775 is hereby incorporated by reference in its entirety.

BACKGROUND

Computing devices may process information. When information is processed, the results of the processing may be new information that may need to be stored for future use.

SUMMARY

In one aspect, a storage device for providing data storage services to a source host and a destination host in accordance with one or more embodiments of the invention includes persistent storage and a controller. The controller obtains a handoff initiation request for a handoff of storage resources of the persistent storage allocated to the source host, the handoff initiation request specifies that the storage resource is to be handed off to the destination host; in response to obtaining the handoff initiation request: quiesces the storage resource; terminates use of the storage resource by the source host after quiescing the storage resource; after terminating the use of the storage resource by the source host, connects the destination host to the storage resource; and after connecting the destination host to the storage resource, enables use of the storage resource by the destination host.

In one aspect, a method for providing data storage services to a source host and a destination host in accordance with one or more embodiments of the invention includes obtaining a handoff initiation request for a handoff of storage resource of persistent storage allocated to the source host, the handoff initiation request specifies that the storage resource is to be handed off to the destination host; in response to obtaining the handoff initiation request: quiescing the storage resource; terminating use of the storage resource by the source host after quiescing the storage resource; after terminating the use of the storage resource by the source host, connecting the destination host to the storage resource; and after connecting the destination host to the storage resource, enabling use of the storage resource by the destination host.

In one aspect, a non-transitory computer readable medium in accordance with one or more embodiments of the invention includes computer readable program code, which when executed by a computer processor enables the computer processor to perform a method for providing data storage services to a source host and a destination host. The method includes obtaining a handoff initiation request for a handoff of storage resource of persistent storage allocated to the source host, the handoff initiation request specifies that the storage resource is to be handed off to the destination host; in response to obtaining the handoff initiation request: quiescing the storage resource; terminating use of the storage resource by the source host after quiescing the storage resource; after terminating the use of the storage resource by the source host, connecting the destination host to the storage resource; and after connecting the destination host to the storage resource, enabling use of the storage resource by the destination host.

Other aspects of the invention will be apparent from the following description and the appended claims.

DETAILED DESCRIPTION

Figure 1:
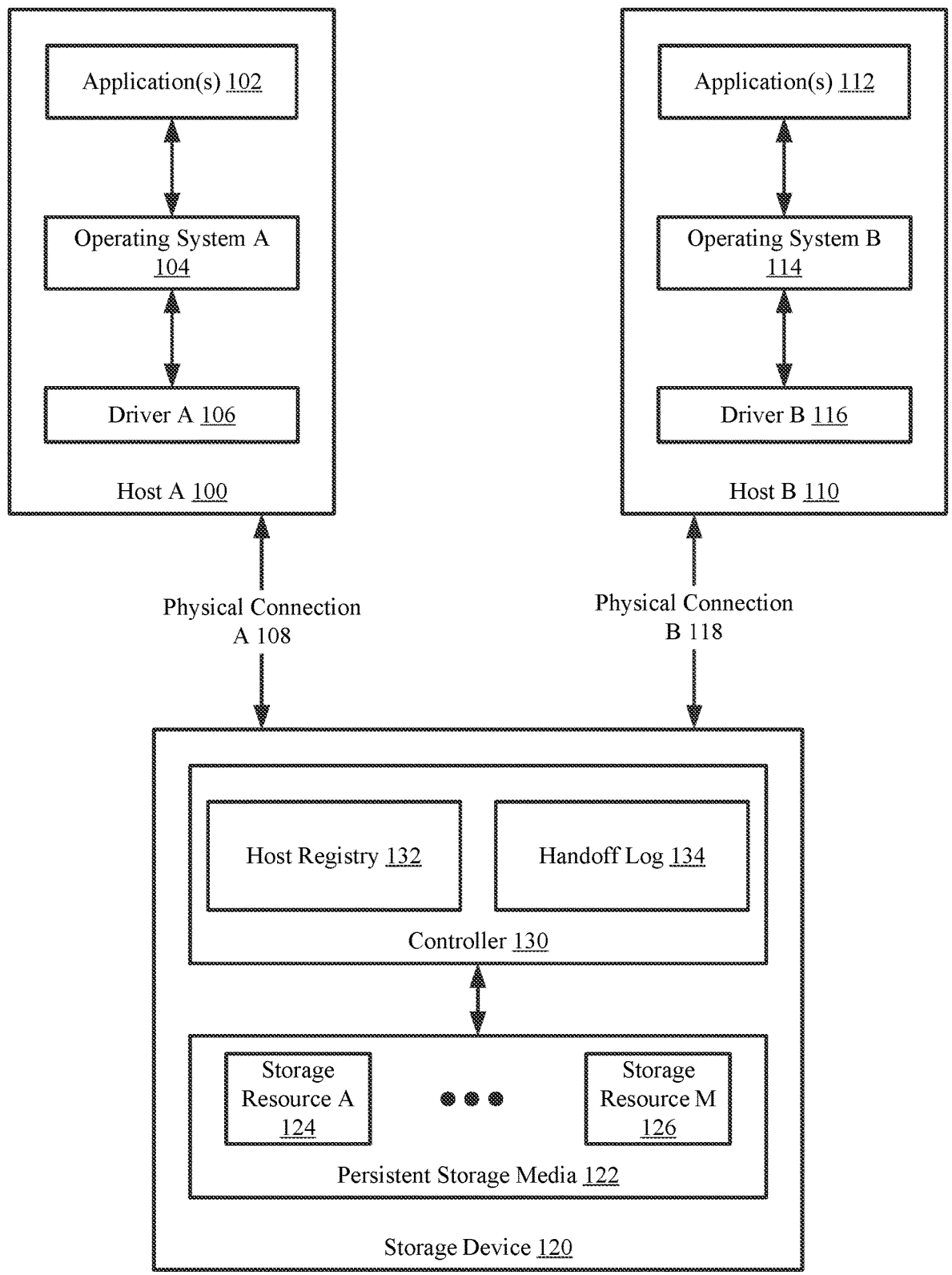
FIG. 1 shows a diagram of system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Storage devices may provide connections for multiple host computers (also referred to as "hosts") to read and write data. If host computers are not explicitly coordinating with one another to access the storage device, a storage device may enforce an exclusive access policy, whereby a portion of the storage may only be accessed exclusively by one host at a time. Once data has been written to the storage device by a first host with exclusive access, it may be desirable to transfer access to that data from a first connected host to a second connected host. One or more embodiments of the invention provide a mechanism for a coordinated "handoff" of a storage resource from the first host to the second host, such that operating systems and applications can be notified of the transfer and participate in synchronizing modifications and handling of error conditions.

In general, embodiments of the invention relate to systems, devices, and methods for performing transfers ("handoffs") of storage resources between hosts. A storage resource may be an allocation of storage capacity of a persistent storage medium. Computing devices, such as hosts, may store data in storage resources. For example, when a host operates, it may store and/or modify data structures such as databases stored in storage resources.

In some cases, multiple hosts may share a persistent storage medium to store data. For example, two hosts may be operably connected to a storage device that includes a persistent storage medium that may be used by multiple hosts.

To manage storage of data in the persistent storage medium by multiple hosts, different portions of the storage capacity of the persistent storage medium may be allocated to different hosts. Consequently, when a host stores data in storage resources that are allocated to it, other hosts may not be able to access the data (e.g., because the storage resources are not allocated to the other hosts).

To facilitate sharing of storage resources between hosts, a system in accordance with embodiments of the invention, may orchestrate the handoff of storage resources from a first host to a second host. The system may orchestrate the handoff using the storage device. Once the storage resources are handed off to the second host, the second host may utilize the data stored in the storage resources.

In one or more embodiments of the invention, the handoffs are orchestrated using a handoff log maintained by the storage device. By utilizing the storage device to orchestrate the handoffs, the hosts may not need to be connected to each other or otherwise interact with each other during the handoff. Consequently, the overhead for performing a handoff may be low when compared to attempting to orchestrate handoffs at the host level.

FIG. 1 shows a system in accordance with one or more embodiments of the invention. The system may facilitate use and sharing of data stored in a storage device (120) by any number of hosts (e.g., 100, 110).

A host (e.g., 100) may provide computer implemented services to users (e.g., persons, other computing devices) of the host. The computer implemented services may include, for example, database services, instant messaging services, electronic communication service, web browsing services, and/or other types of services desired by users of the host.

To provide computer implemented services, hosts (e.g., 100, 110) may include operating systems (e.g., 104, 114) that manage the operation of the hosts, applications (e.g., 102, 112) that provide some of the computer implemented services provided by the hosts, and/or drivers (e.g., 106, 116) that enable the operating systems to use hardware components of the hosts (e.g., 100, 110) and/or other hardware devices operably connected to the hosts. Each of these components of a host is discussed below.

The applications (e.g., 102, 112) may provide all, or a portion, of the computer implemented services utilized by users of the hosts. For example, the applications may include database applications that store and provide stored data, electronic communications applications that enable users of the hosts to send and receive electronic messages, web browsing applications that enables users of the hosts to view content hosted by other computing devices, etc. When providing their functionalities, the applications (e.g., 102, 112) may store data and retrieve previously stored data.

For example, when an electronic communication application provides its functionality, it may need to store electronic communications (e.g., emails) for future use by a user and retrieve previously stored electronic communications to provide users with information regarding previously obtained electronic communications. The aforementioned information regarding the electronic communications may be stored in persistent storage of the hosts (e.g., 100, 110) and/or persistent storage of other devices such as a storage device (120).

As used herein, persistent storage refers to physical storage media such as, for example, hard disk drives, solid state disk drives, tape drives, and/or other types of devices that enable data to be stored and retrieved after being stored. These devices may store data when unpowered, through power cycling, and/or when host devices are unpowered. Consequently, when data is stored in persistent storage, it may be retrieved in the future unless erased (or lost due to failure modes or otherwise undesirable operation of the devices).

To store and retrieve stored data, the applications (e.g., 102, 112) may utilize services provided by operating systems (e.g., 104, 114) of the respective hosts. In other words, rather than attempting to store data in persistent storage directly, the applications may make calls (e.g., requests) to, or otherwise utilize services provided by, the operating systems to store and retrieve stored data.

As noted above, an operating system may manage the operation of a host. Managing the operation of a host may include, for example, allocating computing resources (e.g., processor cycles, memory space, persistent storage space, communications bandwidth, etc.) provided by hardware devices (e.g., processors, memory modules, persistent storage media devices, etc.) for use by applications of the host. When doing so, the operating system may provide a layer of abstraction that reduces the complexity of utilizing the computing resources.

For example, managing the operation of a host may include managing storage of data in persistent storage and retrieving of data stored in persistent storage. To do so, the operating systems (e.g., 104, 114) of the hosts may implement, for example, file systems or other systems that simplify the process of storing and retrieving data in persistent storage media.

A file system may enable applications (102) to store and retrieve data by organizing the data into named files. To store data, the applications may instruct an operating system to store data using a file name. To retrieve stored data, the applications may instruct the operating system to provide it with the data associated with the file name. Consequently, the operating systems (e.g., 104, 114) of the hosts may provide applications with a simplified method of storing data in persistent storage.

The file systems (or other systems) implemented by the operating systems may store data using any method without departing from the invention. For example, the file systems may implement an operation or storage model for storing data. The aforementioned model may enable the file system to translate the data storage requests from the applications into one or more actions to be performed.

The file systems (or other systems) implemented by the operating systems of the hosts may utilize drivers (e.g., 106, 116) to store and retrieve stored data. Persistent storage media devices may, depending on the type of device, have a limited number and type of commands to which they respond. Consequently, when a file system or other data storage organizational system translates data storage requests from applications into action, the drivers (e.g., 106, 116) may further convert the these actions into one or more commands supported by the persistent storage media. The commands may cause the persistent storage media devices to perform any number and type of actions that may cause data to be stored in and/or retrieved from them. Thus, the drivers may abstract the limited number and type of commands to which the persistent media storage devices respond to a predetermined set of commands known to an operating system (i.e., the actions which file systems or other organizational system may utilize to service data storage requests from applications). Consequently, an operating system may implement a file system or other system for storing and retrieving stored data using the predetermined set of commands provided by the driver (e.g., 106, 116). The drivers (106, 116) may be implemented as user-level and/or kernel-level drivers without departing from the invention.

As part of managing computing resources, the operating systems of the hosts may provision portions of the storage resources of a persistent storage media for their exclusive use. For example, the operating systems and/or drivers of the hosts may presume that storage resources are only being used by a single entity (e.g., an operating system) at a time. Consequently, if the storage resources are modified by another entity while being utilized by an operating system, the system employed by the operating system for managing the storage resources may fail (e.g., because data loss and/or corruption may occur). Once provisioned, the operating systems of the hosts may use the provisioned storage resources under the assumption that they are the exclusive user of the resources.

In some cases, the hosts (e.g., 100, 110) may desire to store data in and retrieve data from a storage device (120). The storage device (120) may be a physical device, separate from the hosts, in which data may be stored. The hosts (100, 110) may be operably connected to the storage device (120) through physical connections (e.g. 108, 118).

In general, embodiments of the invention relate to methods and systems for sharing storage devices (e.g., 120) by multiple hosts (e.g., 100, 110). A system in accordance with embodiments of the invention may share the storage devices by performing handoffs between hosts.

A handoff may be a process through which a first host (e.g., 100), that stores data in a storage device (120), relinquishes its exclusive use of some of the storage resources of the storage device (120), notifies a second host (e.g., 110) of its use of the storage device (120), and enables the second host (e.g., 110) to exclusively use the relinquished storage resources. As noted above, when a host utilizes storage resources, it may provision them for its exclusive use. Consequently, other hosts may not have knowledge of the data stored in the provisioned storage resources when exclusively provisioned for a particular host. By performing a handoff, other hosts may learn of the data stored in the storage resources thereby enabling the other hosts to access the data stored in the storage resources.

For example, by performing a handoff, a second host may be made aware of data stored by the first host in the storage device (120). Consequently, the second host (e.g., 110) may modify, read, and/or otherwise utilize the data stored by the first host in the storage device. If a handoff is not performed, the data in the storage resources provisioned by the first host may be unusable (and/or in accessible) by the second host.

The process of performing the handoff may be coordinated by the storage device (120). The hosts involved in a handoff may not communicate with each other prior to, during, and/or after the handoff. Accordingly, the overhead for performing a handoff, from the perspective of the hosts, may be minimal.

For example, the hosts may not need to be connected to one another during the handoff, the operating systems of the hosts may not need to perform special processes for sharing information with each other (e.g., implementing a shared file system), the drivers of the hosts may not need to take any action beyond their normal functionality to perform a handoff, etc. Instead, the storage device (120) may manage the handoff.

To manage handoffs and provide data storage services, the storage device (120) may include persistent storage media (122) and a controller (130). Each of these components is discussed below.

The persistent storage media (122) may include any number of persistent storage media devices such as, for example, hard disk drives, solid state disk drives, tape drives, and/or any other type of persistent storage device. The persistent storage media (122) may include any number and type of such devices.

Each of the persistent storage media devices may enable data to be stored, accessed, and deleted. Different persistent storage media devices may include similar or different amounts of storage space.

The controller (130) may manage storage of data in the persistent storage media (122). To manage the storage of data, the controller (130) may (i) provision storage resources (e.g., 124, 126) for the hosts (e.g., when requested by a host), (ii) service data storage/access requests from the hosts using their provisioned storage resources, and/or (iii) perform handovers of storage resources between hosts (e.g., when requested by a host).

To do so, the controller (130) may include functionality to obtain requests from the hosts using any number of physical connections (e.g., 108, 118) to the hosts. The requests may be made by the drivers (106).

In one embodiment of the invention, the physical connection (108, 118) may represent any tangible cable, or an assembly of wires, configured for inter-device data transfer. Examples of the physical connection may include, but are not limited to, a FireWire cable (which is based on IEEE 1394), a serial advanced technology attachment (SATA) (or any variant thereof) cable, a universal serial bus (USB) (or any variant thereof) cable, a small computer system interface (SCSI) (or any variant thereof) cable, a serial-attached SCSI (SAS) (or any variant thereof) cable, a Thunderbolt cable, or any other cabling solution supported by the storage device. In another embodiment of the invention, the connection may represent any logical connection maintained by a radio or wireless transmission protocol, such as WiFi or Bluetooth, or any other storage protocol executing over a wireless transmission protocol.

A storage resource (e.g., 124, 126) may be a portion of the storage resources of the persistent storage media (122). For example, if the persistent storage media (122) is capable of storing 100 Gigabytes of data, a storage resource may be a portion of that storage space (e.g., 20 Gigabytes).

When a storage resource is provisioned for a host, information regarding the storage resource and host may be stored in a host registry (132). For example, an identifier of the host, a quantity of storage included in the storage resource, and/or access information for the storage resource may be stored in the host registry (132). Additionally, other information such organizational information for the storage resource may be maintained in the host registry (132) without departing from the invention. The organizational information may include, for example, namespaces that specify the data stored in the storage resources. The organizational information may enable entities to ascertain the type and quantity of data in the storage resources, as well as access/use the data in the storage resource. For additional details regarding provisioning of storage resources, refer to FIG. 2.

The host registry (132) may be a data structure maintained by the controller (130). The host registry (132) may be implemented using, for example, lists, tables, linked lists, database, and/or any other type of data structure. The host registry (132) may include any type and quantity of information regarding storage resources and hosts that have provisioned the storage resources.

In some cases, a host may desire that a storage resource provisioned by the host be handed off to another host. To do so, the host may send a request to the storage device (120) that initiates the handoff. In response to the handoff request, the controller (130) may orchestrate a handoff for the storage resource. Upon completion of the handoff, the other host may be able to access and use the data stored in the handed off storage resource. For additional details regarding a handoff, refer to FIG. 3.

When orchestrating a handoff, the controller (130) may store information regarding the handoff in a handoff log (134). The handoff log (134) may be a data structure maintained by the controller (130). The handoff log (134) may be implemented using, for example, lists, tables, linked lists, database, and/or any other type of data structure. The handoff log (134) may include any type and quantity of information regarding a handoff.

The host registry (132) and/or handoff log (134) may be implemented as, for example, in-memory data structures and/or data structures stored in persistent storage. For example, the controller (130) may migrate the aforementioned data structures between memory (not shown) and persistent storage media (122) as required to utilize the aforementioned data structures.

The controller (130) may further include functionality to service commands (e.g., data storage/data access/storage resource allocation commands) from the drivers (e.g., 106, 116) of the hosts. Additionally, the controller (130) may include functionality to service commands from the hosts regarding information included in the handoff log (134) and/or host registry (132) (e.g., read commands).

The controller (130) may be implemented using one or more hardware components that include circuitry. The hardware components may include, for example, application specific integrated circuits (ASIC), programmable gate arrays, embedded processors, general purpose processors, etc. The circuitry of the hardware components may be adapted to perform the functionality of the controller (130). The hardware components of the controller (130) may be adapted to execute computer instructions stored in persistent storage that when executed cause a processor of the hardware components to perform the functionality of the controller (130).

Figure 3:
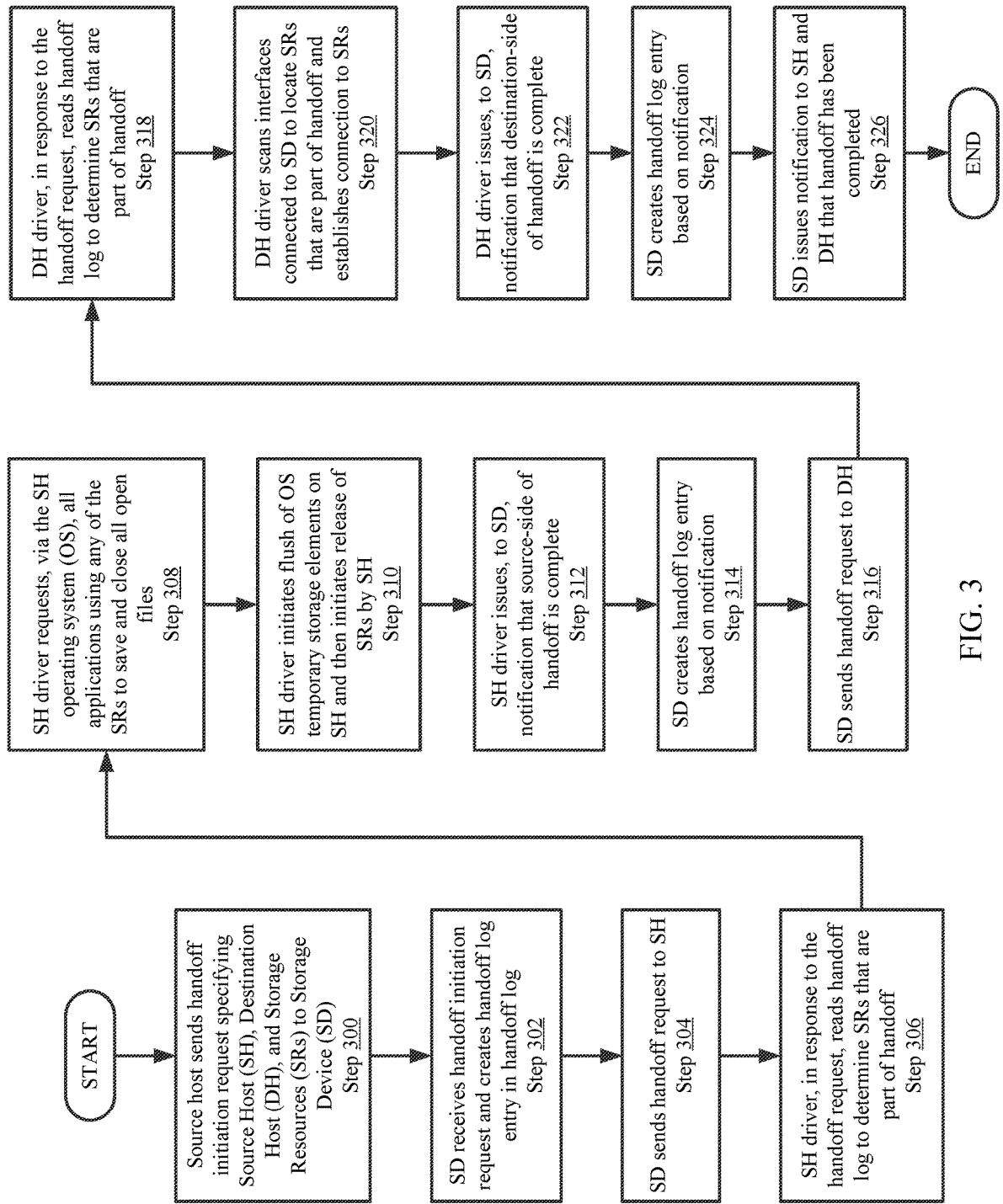
FIG. 3 shows a flowchart of a method of performing a handoff of storage resources in accordance with one or more embodiments of the invention.

When providing its functionality, the controller (130) may perform all, or a portion, of the method illustrated in FIG. 3. When providing its functionality, the controller (130) may utilize data structures stored in memory or persistent storage. The data structures may include a host registry (132) and a handoff log (134).

The hosts (e.g., 100, 110) and/or storage device (120) of FIG. 1 may be implemented using computing devices. The computing devices may be, for example, mobile phones, tablet computers, laptop computers, desktop computers, servers, and cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the components illustrated in FIG. 1 described in this application and/or all, or a portion, of the methods illustrated in FIGS. 2-3. The hosts (e.g., 100, 110) and/or storage device (120) may be implemented using other types of computing devices without departing from the invention. For additional details regarding computing devices, refer to FIG. 5.

The hosts (e.g., 100, 110) and/or storage device (120) may be implemented using logical devices without departing from the invention. For example, the hosts (e.g., 100, 110) and/or storage device (120) may be implemented using virtual machines that utilize computing resources of any number of physical computing devices (e.g., refer to FIG. 5) to provide their respective functionalities. The hosts (e.g., 100, 110) and/or storage device (120) may be implemented using other types of logical devices without departing from the invention.

In some embodiments of the invention, the hosts and storage device may be implemented using a combination of physical and logical devices. For example, the hosts may be implemented as virtual machines hosted by a single computing device. The single computing device may be connected to the storage device. A hypervisor (or other management entity) may provide virtual connections between the virtual machines and the storage device by virtualizing a physical connection between the computing device and the storage device.

While the system of FIG. 1 has been illustrated as including a limited number of specific components, a system in accordance with embodiments of the invention may include additional, fewer, and/or different components without departing from the invention.

Figure 2:
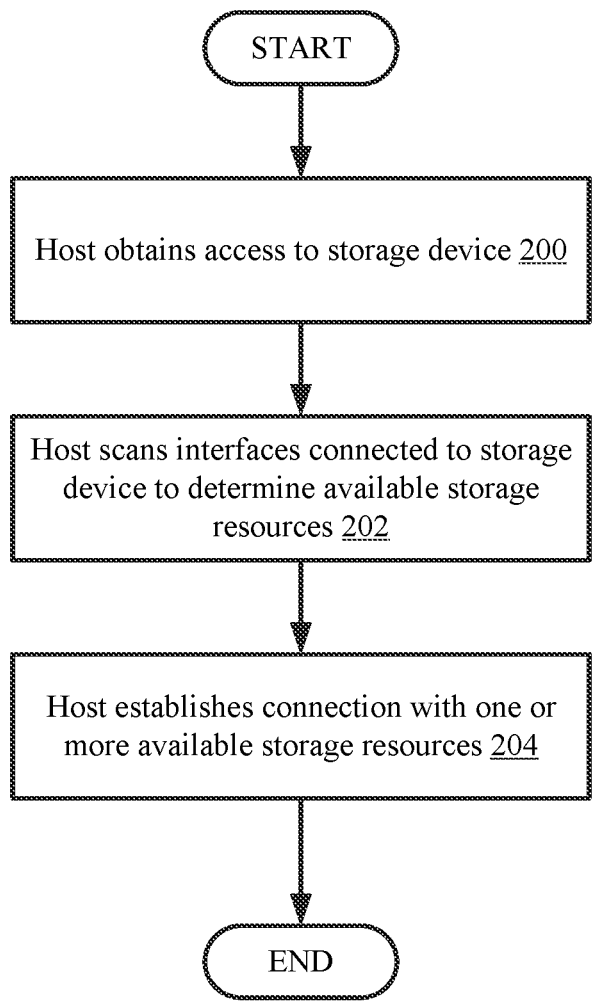
FIG. 2 shows a flowchart of a method of provisioning storage resources in accordance with one or more embodiments of the invention.

As discussed above, the system of FIG. 1 may enable multiple hosts to access data stored in a data storage device. FIGS. 2-3 illustrate flowcharts of methods that may be performed by the components of FIG. 1 to provide multiple hosts with access to data stored in a data storage device.

FIG. 2 shows a flowchart of a method in accordance with one or more embodiments of the invention. The method depicted in FIG. 2 may be used to enable a host to access storage resources of a storage device in accordance with one or more embodiments of the invention. The method shown in FIG. 2 may be performed by, for example, a host (e.g., 100, FIG. 1). Other components of the system in FIG. 1 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, a host obtains access to a storage device. The host may obtain access to the storage device via an operable connection. The operable connection may be supported by a physical or virtual connection.

For example, the host may obtain access to the storage device by connecting the host to the storage device via a universal serial bus cable (or any other type of cable). Once connected, the host's driver may utilize the physical connection to establish an operable connection to the storage device. The operable connection may enable the host to communicate with the controller of the storage device, determine a type of the storage device (e.g., to determine that the operating system of the host should use a particular driver for communicating with the data storage device), access/store data in the data storage device, etc.

In step 202, the host scans interfaces connected to the storage device to determine the storage resources of the host that are available for provisioning. To scan the interfaces, the host may utilize the operable connection, discussed with respect to step 200.

Scanning the interfaces of the storage devices may include requesting, from a connected host, the availability of storage resources of the persistent storage media managed by the controller. In response to the request, the storage device may notify the host of the availability of storage resources. The notification may specify, for example, a quantity of storage resources of the storage device that have not been provisioned for use by other devices (e.g., other hosts).

The host may scan the interfaces of the storage device by, for example, requesting that the driver of the host ascertain the availability of storage resources of the storage device. In turn, the driver may perform one or more actions in accordance with a communication standard employed by the storage device to ascertain the available storage resources of the storage device.

In response to the actions, the host may identify storage resources that are not provisioned. To do so, the controller may utilize the information included in the host registry (132, FIG. 1.). Specifically, the controller may utilize the information to ascertain which storage resources are already provisioned and which have not yet been provisioned. The storage resources that have not yet been provisioned may be reported to the host as the storage resources available for provisioning.

In step 204, the host establishes a connection with one or more available storage resources. The host may establish the connection by provisioning the one or more available storage resources.

To provision the storage resources, the host may send, using the driver, a command to the controller of the storage device. The command may request that the one or more storage resources be provisioned for the host.

In response to the command, the storage device may provision the one or more storage resources for the host. To do so, the storage device may update the host registry (132, FIG. 1) to reflect that the one or more storage resources have been provisioned for the host.

Additionally, the storage device may provide, to the host, access information for the provisioned storage resources. The access information may include, for example, device identifiers (e.g., which of the persistent storage media devices are being provisioned, in part, for the host), block identifiers (e.g., block identifier ranges of corresponding persistent storage devices provisioned for the host), and/or other types of information (e.g., offsets) that may enable the host to address (directly or indirectly) various portions of the storage resources provisioned for the host.

In one or more embodiments of the invention, when the storage device provisions storage resources, the access information corresponding to the provisioned storage resources may be added to the host registry (132, FIG. 1). The host may also provide information (e.g., access information) that it will use to storage/access data in the storage device. The controller of the storage device may use the host provided access information and its own access information to form a translation table. By doing so, the host may utilize its own system for organizing its data to store data in and access data stored in the provisioned storage resources of the storage device (e.g., rather than having to use the storage device's access information).

The method may end following step 204.

Using the method illustrated in FIG. 2, hosts may provision storage resources of storage devices for their use. Once provisioned, the controller of a storage device may monitor the data storage activities of the host to map out the data stored in its storage resources (e.g., to generate a representation of a namespace). The controller of the storage device may store such information in its host registry. By doing so, the controller may generate a namespace or other organizational system used by the host for the data stored in the storage resources. As will be discussed below with respect to FIG. 3, the controller may also (or alternatively) obtain a copy of a namespace or other organization system used by the host during a handoff.

FIG. 3 shows a flowchart of a method in accordance with one or more embodiments of the invention. The method depicted in FIG. 3 may be used to handoff storage resources between hosts in accordance with one or more embodiments of the invention. The method shown in FIG. 3 may be performed by, for example, a host (e.g., 100, FIG. 1). Other components of the system in FIG. 1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a source host send, to a storage device, a handoff initiation request specifying the source host, a destination host, and storage resources to be handed off to the destination host. For example, the host may send, using a driver, an identifier of the source host, an identifier of the destination host, and identifiers of the storage resources to be handed off to the destination host. The destination host may be another host that is also operably connected to the storage device.

In step 302, the storage device receives the handoff initiation request and creates a handoff log entry in a handoff log. The handoff log entry may specify that a handoff of the storage resources to the destination host is to be performed. The handoff log entry may be, for example, one or more rows in a table. The handoff log and handoff log entry may be different types of data structures (e.g., other than tables) without departing from the invention. The handoff log entry may be created by, for example, adding a new entry or modifying an existing entry to reflect the handoff that is to be performed. The handoff log entry may specify that the handoff is in process.

In step 304, the storage device sends a handoff request to the source host. The handoff request may be a request that the storage device prepare for it to lose access to the storage resources. The handoff request may be read by a driver that manages communications with the storage device.

In step 306, the source host driver, in response to the handoff request, reads the handoff log to determine the storage resources that are part of the handoff. In other words, the source host driver may read the handoff log entry added to the handoff log in step 302 and, based on that reading, identify the storage resources to which access will be lost due to the handoff.

For example, the handoff log entry may specify the storage resources that are provisioned for the source host that will be handed off to the destination host. The handoff log entry may specify the storage resources using any method (e.g., by including access information for the storage resources, by including names of files stored in the storage resources, etc.).

In step 308, the source host driver requests, via the operating system of the source host, that all applications using any of the storage resources determined in step 306 save and close any open files stored in the storage resources. The operating system may do so using any method without departing from the invention. In other words, the operating system may quiesce the files stored in the storage resources and prevent future modification of the files by the source host.

For example, the operating system may use inter-process communication, message broadcasting, or other methods to notify the applications that the storage resources are going to be closed, the operating system may identify the files stored in the storage resources and notify the applications of the impacted files, etc.

In step 310, the source host initiates a flush of modified storage elements managed by the operating system of the source host and initiates release of the storage resources by the source host. For example, the operating system may flush modified memory or buffer cache pages, or other data structures temporarily stored in the resources of the host. After doing so, the operating system may, using the driver, release the provisioned storage resources. The driver may do so by performing one or more actions (e.g., send specially formed communications) to notify the storage device of the release.

In one or more embodiments of the invention, the source host provides a copy of the namespace or other file used to organize the data stored in the storage resources. For example, a file allocation table for the storage resources may be provided to the storage device during release of the storage resources.

In step 312, the source host driver issues, to the storage device, a notification that the source-side of the handoff is complete. In other words, the notification may indicate that the source host has completed all of its actions required to complete a handoff of the storage resources.

In step 314, the storage device updates the handoff log based on the notification. For example, the storage device may modify the handoff log entry created in step 302, may add a new log entry corresponding to the notification, or may otherwise modify the handoff log to reflect that the notification has been received. The updated handoff log may reflect that the source-side of the handoff is complete.

In step 316, the storage device sends a handoff request to the destination host. The handoff request may specify that the destination host is part of a handoff and needs to read the handoff log to ascertain how to proceed.

In step 318, the destination host driver, in response to the handoff request, reads the handoff log to determine that the storage resource is part of the handoff. Specifically, the destination host driver reads the handoff log and determines that (i) storage resources are being handed off to the destination host and (ii) which of the storage resources of the storage devices are being handed off to the destination host as part of the handoff.

In step 320, the destination host scans interfaces connected to the storage device to locate storage resources that are part of the handoff and establishes connections to the storage resources. Scanning the interfaces may include requesting, from the controller, identifiers and/or access information for the storage resources that are being handed off to the destination host. Once identified, the driver of the destination host may request that the controller of the storage device provision the storage resources for the destination host.

In response, the controller of the storage device may provision the storage resources for the destination host. When provisioning the storage resources, the controller may provide, to the destination host, the namespace used by the source host to organize the data stored in the storage resources. Consequently, the destination host may be provided with information that enables it to ascertain (e.g., portions of the storage resources in which different files are stored, identifiers of the files, etc.) the data stored in the storage resources. The operating system of the destination host may use the namespace to manage (e.g., provide applications with information regarding the data so that the applications can read, modify, delete the data) the data stored in the storage resources.

When the controller provisions the storage resources for the destination host, the controller may update the host registry (132, FIG. 1) to reflect that the destination host is now utilizing these storage resources.

After the storage resources are provisioned for the destination hosts, the driver of the destination host may notify the operating system of the destination host of the availability of the storage resources. Consequently, the operating system may present the storage resources, and the data stored therein, as available for use to the applications hosted by the destination host.

In step 322, the destination host driver issues, to the storage device, a notification that the destination-side of the handoff is complete. The notification may indicate that the destination host has completed all of the actions required for it to access and use the storage resources and data stored therein.

In step 324, the storage device updates the handoff log based on the notification. For example, the storage device may modify the handoff log entry created in step 302 to reflect the notification, may add a new log entry corresponding to the notification, or may otherwise modify the handoff log to reflect that the notification has been received (and the information included therein). The updated handoff log may reflect that the destination-side of the handoff is complete.

In step 326, the storage device issues a notification to the source host and the destination host that the handoff has been completed. The storage device may issue the notification based on the updated handoff log indicating that both the source-side and the destination-side of the handoff are complete.

The method may end following step 326.

Using the method illustrated in FIG. 3, a system in accordance with embodiments of the invention may enable provisioned storage resources to be handed off between hosts connected to a storage device.

Figure 4:
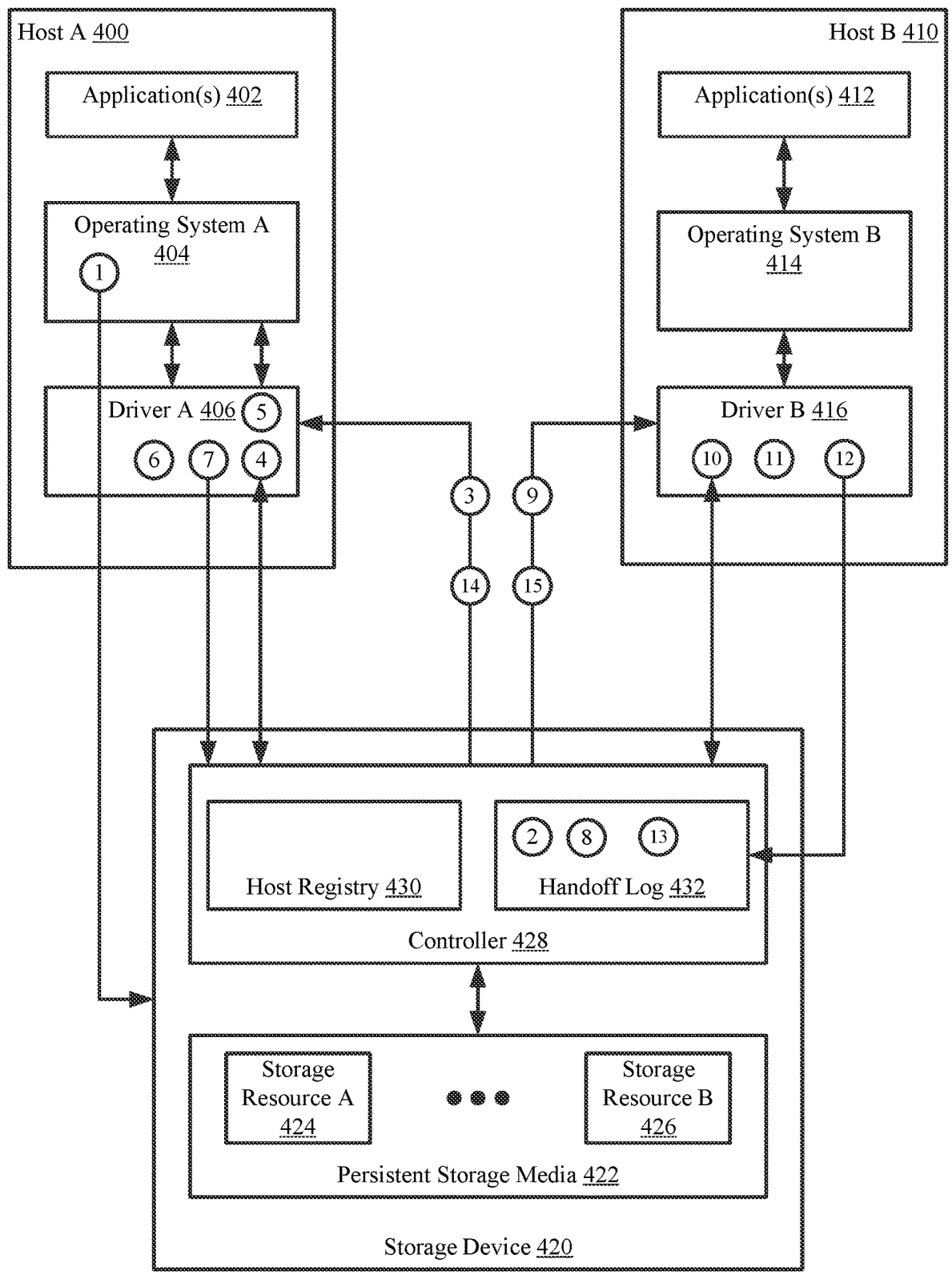
FIG. 4 shows a diagram of an example system and its operation over time in accordance with one or more embodiments of the invention.

To further clarify embodiments of the invention, a non-limiting example is provided in FIG. 4. FIG. 4 shows a system similar to that illustrated in FIG. 1. For the sake of brevity, only a limited number of components of the system of FIG. 1 are illustrated in FIG. 4.

Example

Consider a scenario as illustrated in FIG. 4 in which two hosts (400, 410) are operably connected to a storage device (420). At a first point in time illustrated in FIG. 4, host A (400) has provisioned storage resources A (424) of the persistent storage media (422) and host B (410) has provisioned storage resources B (426). Neither host is connected to the other and, consequently, are unable to communicate with each other.

Over time, the applications (402) of host A (400) make calls to operating system A (404) to store a database in storage resources A (424). To do so, operating system A (404) instructs driver A (406) to store the various entries of the database in storage resources A (424).

At a second point in time, a user of host A (400) decides that applications (412) of host B (410) need to access the database. Consequently, the user instructs the operating system A (404) of host A (400) to initiate a handoff of storage resource A (424) to host B (410).

To initiate the handoff, operating system A (404) performs step 1 by sending handoff initiation request, using driver A (406), to the storage device (420). The handoff initiation request specifies that storage resources A (424) is to be handed off to host B (410).

When the handoff initiation request is received by the controller (428) of the storage device (420), the controller (428) performs step 2 by updating the handoff log (432) maintained by the controller (428). Specifically, the handoff log (432) is updated to reflect that storage resource A (424) is being handed off to host B (410).

After updating the handoff log (432), the controller performs step 3 by sending a handoff notification to the driver A (406). In response to receiving the handoff notification, the driver A (406) performs step 4 by determining that storage resource A (424) is being handed off by reading the handoff log (432). After determining that storage resource A (424) is being handed off, driver A (406) performs step 5 by requesting, via operating system A (404), all applications using any of storage resource A (424) to save and close all files stored in storage resource A (424). Consequently, the files stored in storage resource A (424) are quiesced.

After quiescing the files in storage resource A (424), driver A (406) performs step 6 by requesting that the operating system flush all modified files and blocks and release storage resource A (424). After doing so, driver A (406) performs step 7 by notifying the storage device (420) that its side of the handoff is complete.

In response to being notified that Host A's (400) side of the handoff is complete, the controller (428) performs step 8 by updating the handoff log (432) to reflect that the source-side of the handoff is complete. After updating the handoff log, the driver performs step 9 by sending a handoff notification to driver B (416) of host B (410). The notification indicates that host B (410) is involved in a handoff and should read the handoff log (432).

In response to receiving the notification, the driver B (416) performs step 10 by determining that storage resource A (424) is to be handed off to it by reading the handoff log (432). In response to determining that storage resource A (424) is being handed off to it, driver B (416) performs step 11 by scanning the interfaces connected to the storage device (420) to locate storage resource A (424) and establish a connection to them.

After connecting to storage resource A (424), the driver performs step 12 by sending a notification to the controller (428) that the destination-side of the handoff has been completed. In response, the controller (428) performs step 13 by updating the handoff log (432) to indicate that both sides of the handoff have been completed. Once updated, controller (428) performs steps 14 and 15 by sending handoff completion notifications to drivers A and B (406, 416), respectively.

End of Example

Thus, as illustrated in FIG. 4, embodiments of the invention may provide a system that enables storages resources to be handed off between hosts.

While the invention has been described with respect to two physical hosts (e.g., Host A and Host B) connected to a physical storage device, embodiments of the invention are not limited to this physical embodiment. Specifically, embodiments of the invention may also be implemented in scenarios in which Host A and Host B are each implemented in/as virtual machines executing on the same physical host where these hosts are operatively connected, via a hypervisor (executing on the physical host), to a storage device (which may or may not be directly physically connected to the physical hos). For example, the storage device may be operatively connected to the physical host over a network. In the above scenario, Host A and Host B (which are implemented in/using virtual machines) and the storage device operate in the same manner as described above with respect to FIGS. 2-3.

Figure 5:
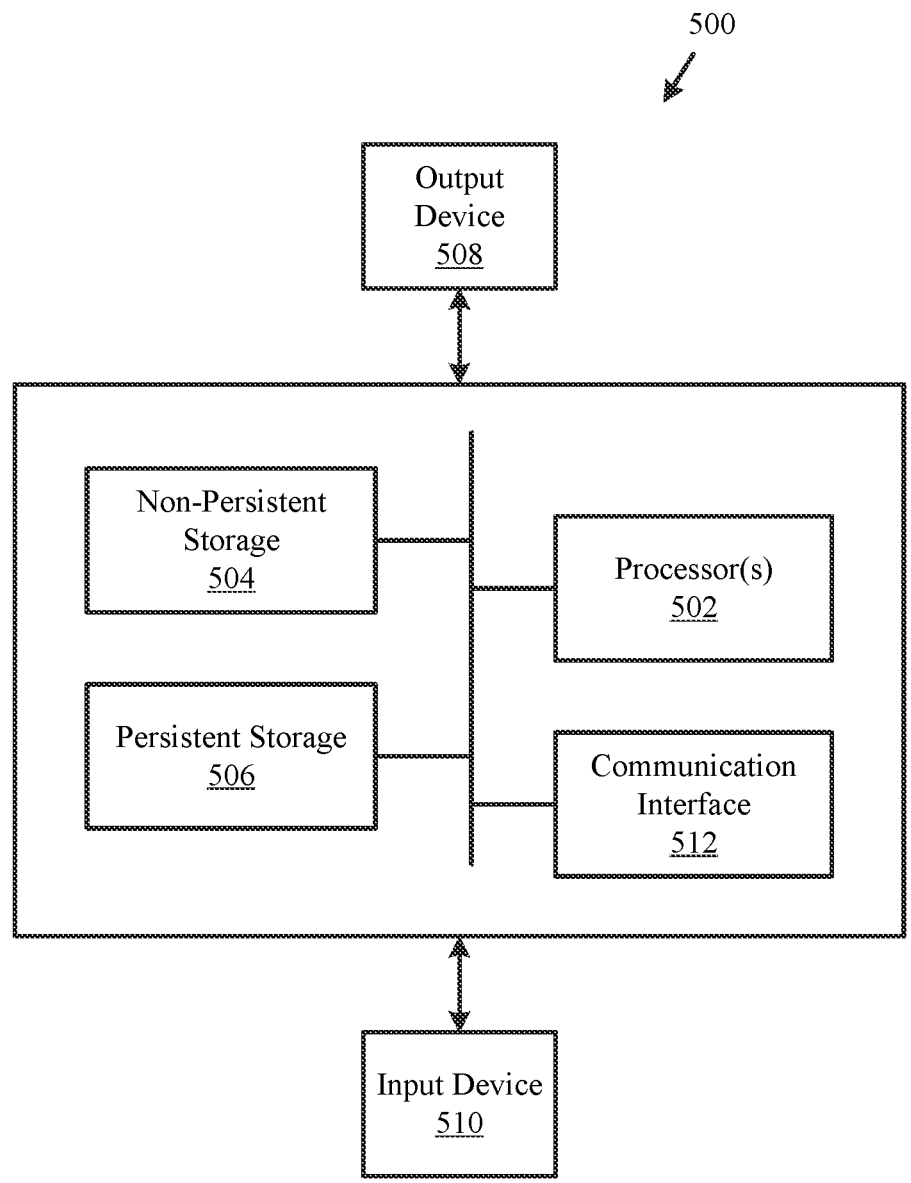
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system and method for facilitate handoff of storage resources between multiple hosts. To do so, embodiments of the invention may provide a system that utilizes a storage device to manage the process of performing a handoff. The storage device may maintain a log of the process of performing a handoff which may be accessed by the hosts. Consequently, the hosts may obtain information regarding the handoff without directly communicating with one another. Consequently, the overhead for performing a handoff may be reduced.

Thus, embodiments of the invention may address the problems of limited resources in systems for performing handoffs. Specifically, embodiments of the invention may reduce the overhead for performing a handoff by not requiring that the operating systems, drivers, and/or other components of hosts cooperate with each other when performing a handoff.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A storage device for providing data storage services to a source host and a destination host, comprising:
    persistent storage; and
    a controller programmed to:
        obtain a handoff initiation request for a handoff of storage resources of the persistent storage allocated to the source host, wherein the handoff initiation request specifies that the storage resource is to be handed off to the destination host;
        in response to obtaining the handoff initiation request:
            quiesce the storage resource;
            terminate use of the storage resource by the source host after quiescing the storage resource;
            after terminating the use of the storage resource by the source host, connect the destination host to the storage resource; and
            after connecting the destination host to the storage resource, enable use of the storage resource by the destination host.

2. The storage device of claim 1, wherein quiescing the storage resource comprises:
    updating a handoff log based on the handoff initiation request to obtain an updated handoff log that indicates that the storage resource is to be handed off to the destination host; and
    initiate, using the updated handoff log, closure of all open files of the source host that use the storage resource by sending a handoff request to the source host.

3. The storage device of claim 2, wherein closure of all of the open files is initiated by causing a driver of the source host to read the updated handoff log, wherein the driver manages use of the storage resource by an operating system hosted by the source host.

4. The storage device of claim 3, wherein terminating the use of the storage resource by the source host comprises:
    initiating a flush of modified storage elements that use the storage resource; and
    after the modified storage elements are flushed, releasing the storage resource.

5. The storage device of claim 4, wherein the flush of the modified storage elements is initiated by the driver in response to reading the updated handoff log.

6. The storage device of claim 1, wherein connecting the destination host to the storage resource comprises:
    updating a handoff log, based on a notification from the source host indicating that a source-side of the handoff is complete, to obtain an updated handoff log that indicates that the storage resource is being handed off to the destination host; and
    cause, using the updated handoff log, a driver of the destination host to connect to the storage resource.

7. The storage device of claim 1, wherein enabling use of the storage resource by the destination host comprises:
    updating a handoff log, based on a notification from the destination host indicating that a destination-side of the handoff is complete, to obtain an updated handoff log that indicates that the destination host is connected to the storage resource; and
    after obtaining the updated handoff log, notify both the source host and destination host that the handoff is complete.

8. A method for providing data storage services to a source host and a destination host, comprising:
    obtaining a handoff initiation request for a handoff of storage resource of persistent storage allocated to the source host, wherein the handoff initiation request specifies that the storage resource is to be handed off to the destination host;
    in response to obtaining the handoff initiation request:
        quiescing the storage resource;
        terminating use of the storage resource by the source host after quiescing the storage resource;
        after terminating the use of the storage resource by the source host, connecting the destination host to the storage resource; and
        after connecting the destination host to the storage resource, enabling use of the storage resource by the destination host.

9. The method of claim 8, wherein quiescing the storage resource comprises:
    updating a handoff log based on the handoff initiation request to obtain an updated handoff log that indicates that the storage resource is to be handed off to the destination host; and
    initiating, using the updated handoff log, closure of all open files of the source host that use the storage resource by sending a handoff request to the source host.

10. The method of claim 9, wherein closure of all of the open files is initiated by causing a driver of the source host to read the updated handoff log, wherein the driver manages use of the storage resource by an operating system hosted by the source host.

11. The method of claim 10, wherein terminating the use of the storage resource by the source host comprises:
    initiating a flush of modified storage elements that use the storage resource; and
    after the modified storage elements are flushed, releasing the storage resource.

12. The method of claim 11, wherein the flush of the modified storage elements is initiated by the driver in response to reading the updated handoff log.

13. The method of claim 8, wherein connecting the destination host to the storage resource comprises:
    updating a handoff log, based on a notification from the source host indicating that a source-side of the handoff is complete, to obtain an updated handoff log that indicates that the storage resource is being handed off to the destination host; and cause, using the updated handoff log, a driver of the destination host to connect to the storage resource.

14. The method of claim 8, wherein enabling use of the storage resource by the destination host comprises:

updating a handoff log, based on a notification from the destination host indicating that a destination-side of the handoff is complete, to obtain an updated handoff log that indicates that the destination host is connected to the storage resource; and after obtaining the updated handoff log, notify both the source host and destination host that the handoff is complete.

15. The method of claim 8, wherein the source host is executing in a virtual machine and the destination host is operating in a second virtual machine, wherein the virtual machine and the second virtual machine are operatively connected to the storage resource.

16. A non-transitory computer readable medium comprising computer readable program code, which when executed by a computer processor enables the computer processor to perform a method for providing data storage services to a source host and a destination host, the method comprising:

obtaining a handoff initiation request for a handoff of storage resource of persistent storage allocated to the source host, wherein the handoff initiation request specifies that the storage resource is to be handed off to the destination host;

in response to obtaining the handoff initiation request:
quiescing the storage resource;
terminating use of the storage resource by the source host after quiescing the storage resource;
after terminating the use of the storage resource by the source host, connecting the destination host to the storage resource; and
after connecting the destination host to the storage resource, enabling use of the storage resource by the destination host.

17. The non-transitory computer readable medium of claim 16, wherein quiescing the storage resource comprises:

updating a handoff log based on the handoff initiation request to obtain an updated handoff log that indicates that the storage resource is to be handed off to the destination host; and initiating, using the updated handoff log, closure of all open files of the source host that use the storage resource by sending a handoff request to the source host.

18. The non-transitory computer readable medium of claim 17, wherein closure of all of the open files is initiated by causing a driver of the source host to read the updated handoff log, wherein the driver manages use of the storage resource by an operating system hosted by the source host.

19. The non-transitory computer readable medium of claim 17, wherein terminating the use of the storage resource by the source host comprises:

initiating a flush of modified storage elements that use the storage resource, wherein the flush of the modified storage elements is initiated by a driver in response to reading the updated handoff log; and after the modified storage elements are flushed, releasing the storage resource.

20. The non-transitory computer readable medium of claim 16, wherein connecting the destination host to the storage resource comprises:

updating a handoff log, based on a notification from the source host indicating that a source-side of the handoff is complete, to obtain an updated handoff log that indicates that the storage resource is being handed off to the destination host; and cause, using the updated handoff log, a driver of the destination host to connect to the storage resource.

* * * * *